Patented July 23, 1946

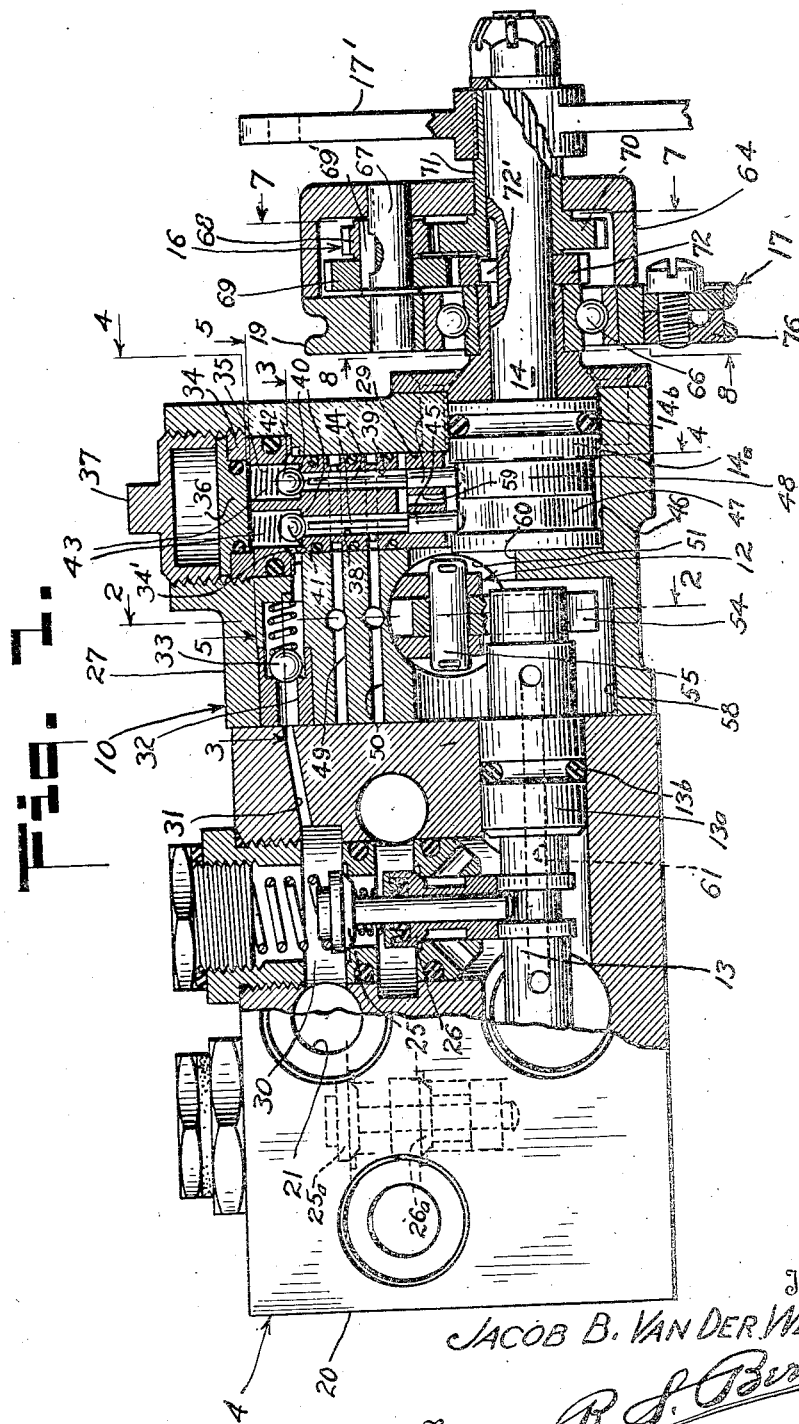

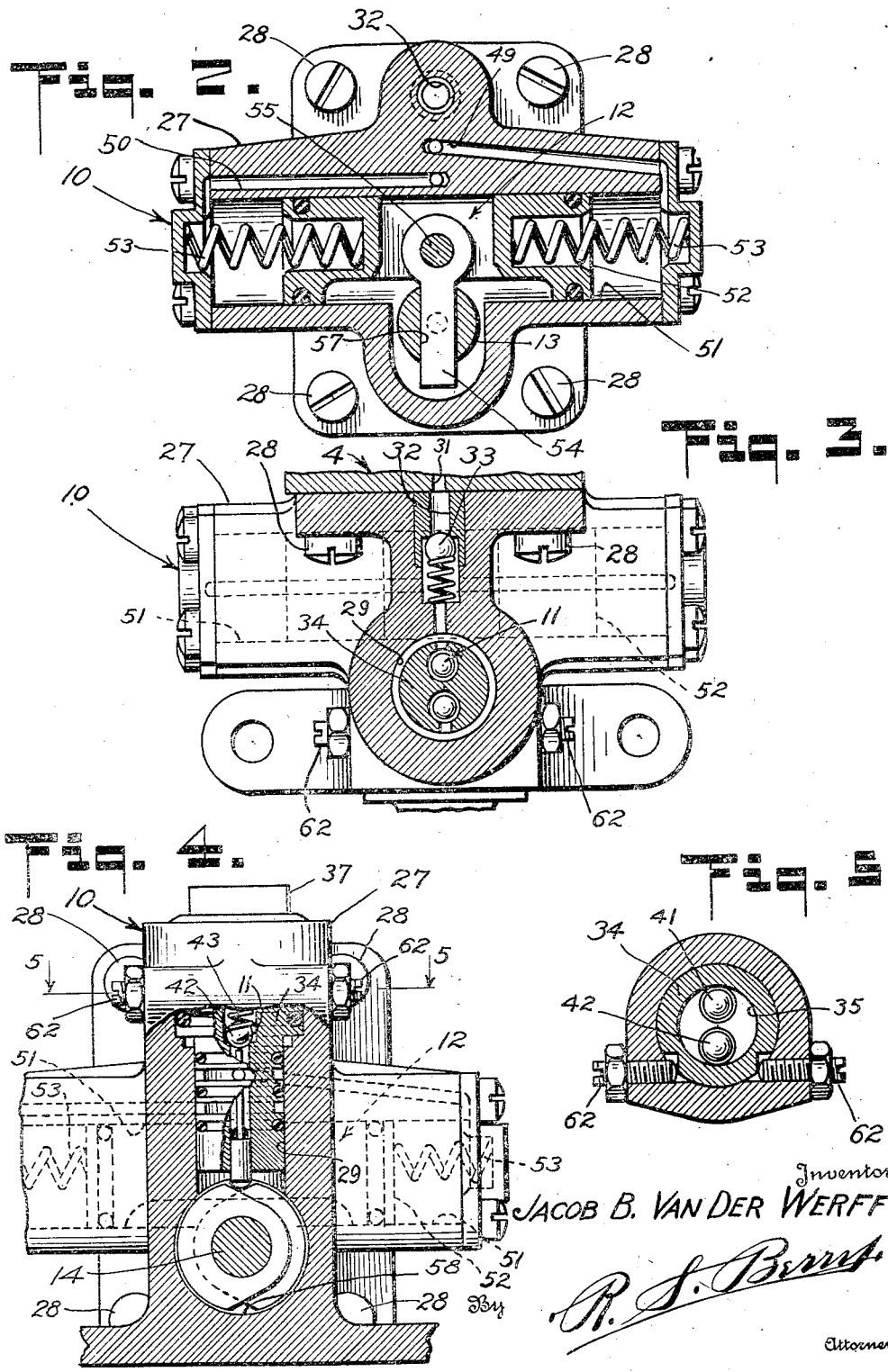

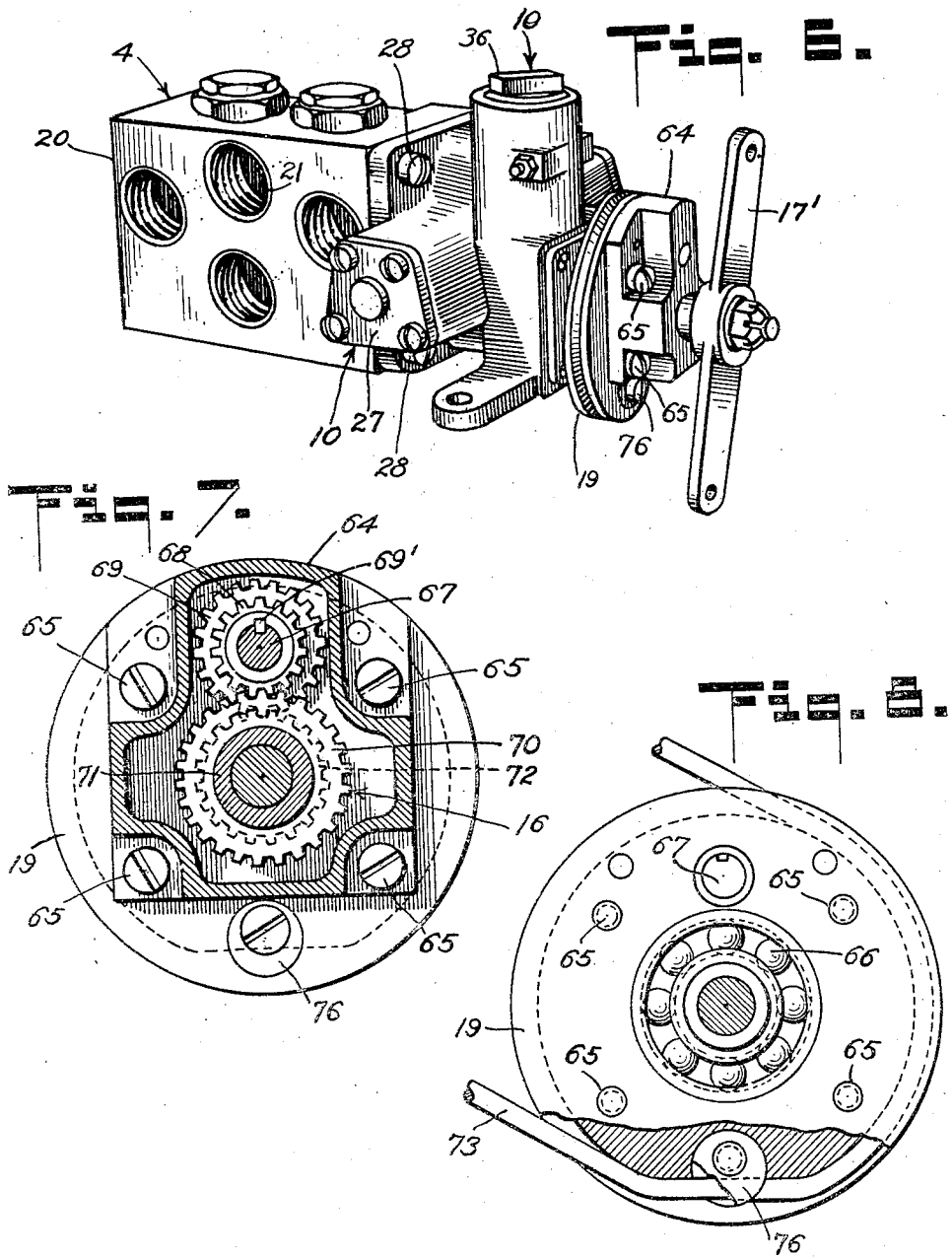

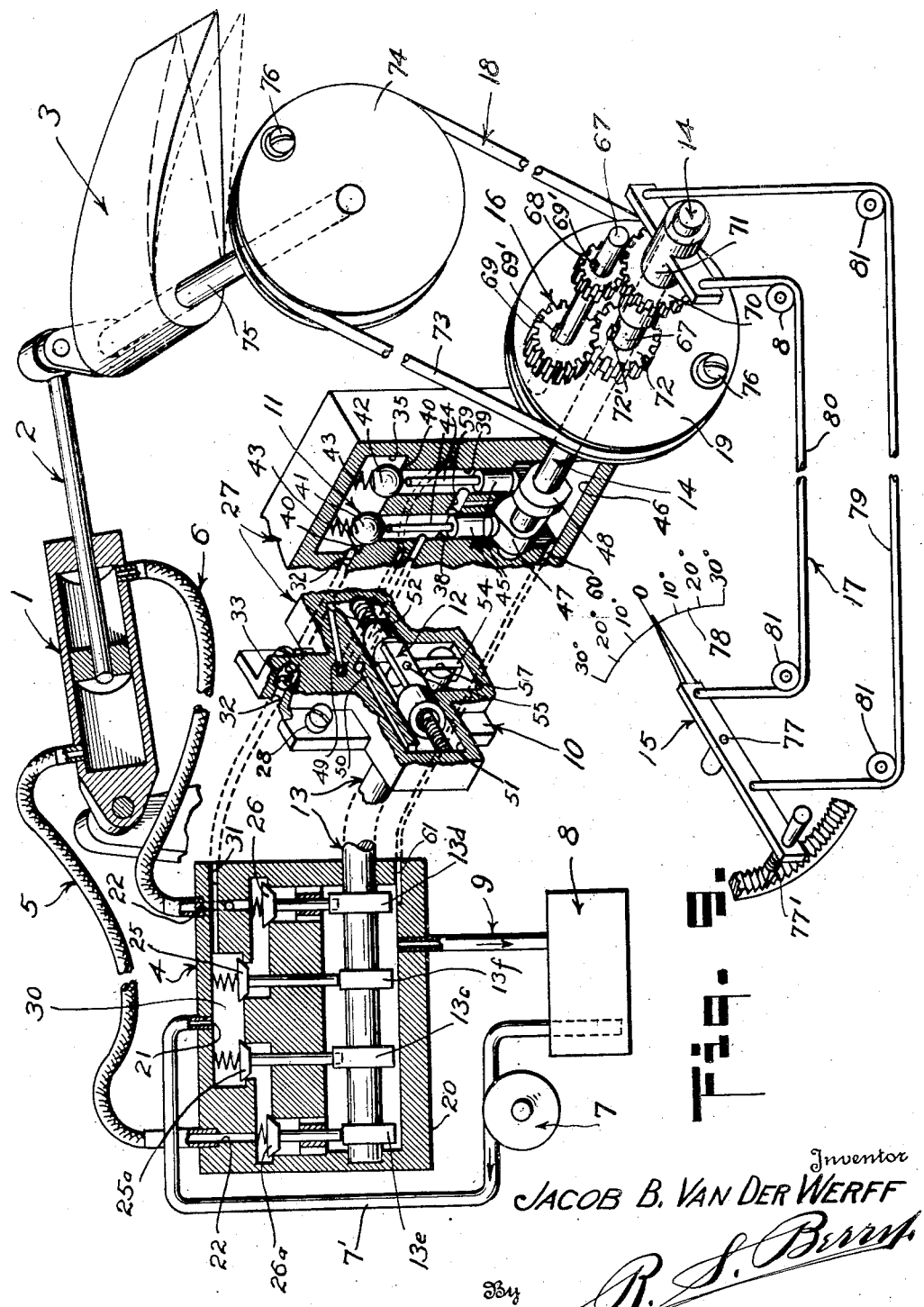

2,404,552

UNITED STATES PATENT OFFICE 2,404,552

POSITION CONTROL FOR HYDRAULIC ACTUATORS

Jacob B. Van Der Werff, Pasadena, Calif., assignor to Adel Precision Products Corp., a corporation of California Application February 26, 1944, Serial No. 524,143

5 Claims. (Cl. 121—41)

This invention relates to a hydraulic actuator which is primarily designed for operating the wing flaps and other controls of aircraft but is also subject to many other analogous hydraulic control applications.

An object of the present invention is to provide efficient position control or "follow-up" mechanisms which will enable the pilot of an aircraft or the operator of any apparatus subject to control by this mechanism, to obtain the desired movement of a wing flap or other control or apparatus, by simply moving a control handle into a calibrated position and then releasing the handle, the said position control mechanism upon such movement of said handle operating to move the wing flap or the like into a position as predetermined by the position in which the handle is stopped or set, then operating when the flap or control or apparatus reaches said predetermined position, to shut off the hydraulic actuator and hold the flap or control in the selected position, while the handle serves as a "tell-tale" indicating the position of the wing flap or other control at all times.

Another object of my invention is to provide a hydraulic actuator system in which a servomotor actuated main control valve for controlling a hydraulic cylinder, or similar hydraulic motor actuator, is operatively associated with a position control means of the character described so that the aircraft wing flap or other control or apparatus to which the main actuator means is connected may be operated and controlled with a greater nicety, accuracy and positiveness and in a particularly efficacious manner upon manipulation of a control lever having a comparatively low handle load by reason of the servo-motor and associated elements.

A further object of my invention is to provide a position control or "follow-up" actuator unit such as described which is well adapted for an accurate remote control and position control of devices and mechanisms other than hydraulic valves and in all instances in the advantageous manner herein set forth.

A further object is to provide a control mechanism such as described in which the main control valve is fully opened with the first small movement, for example, during the first seven degrees of movement of the control handle, and which will remain fully open until the wing flap or other control has nearly completed its intended movement, the closing movement of the main control valve taking place when the wing flap is within the last few degrees of movement into its selected position, for example within the last seven degrees, and being completed on completion of the intended movement of said flap.

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Fig. 1 is a fragmentary longitudinal sectional view partly in side elevation of a servo-motor operated 4-way control valve embodying the present invention;

Fig. 2 is a vertical sectional view taken on the line 2—2 of Fig. 1;

Fig. 3 is a fragmentary horizontal sectional view taken on the line 3—3 of Fig. 1;

Fig. 4 is a fragmentary vertical sectional view taken on the line 4—4 of Fig. 1;

Fig. 5 is a cross sectional view taken on the line 5—5 of Fig. 4;

Fig. 6 is a perspective view of the unit shown in Fig. 1;

Fig. 7 is a vertical sectional view taken on the line 7—7 of Fig. 1, particularly showing the planetary position control drive means;

Fig. 8 is a vertical sectional view taken on the line 8—8 of Fig. 1;

Fig. 9 is a diagrammatic view of a control system embodying my invention and particularly showing the pulley drive and planetary drive mechanisms for effecting position control in accordance with this invention.

One embodiment of the present invention is carried out by providing in a hydraulic system, in which a hydraulic cylinder or similar fluid responsive motor or actuator for an aircraft wing flap or other control element is controlled by a hydraulic valve unit, a remote control mechanism which determines the position of the wing flap or control element responsive to and in accordance with the setting of a manually operable control member such as a lever or handle located in the cabin or cockpit of the aircraft.

In accordance with my invention, the remote control-position control mechanism hereof is operatively connected with the hydraulic valve unit here shown, the control handle in the cockpit, and the main actuator for the wing flap or other control element, so that said mechanism and valve unit will respond to movement of the main actuator element as well as to movement of said handle.

As here shown the position control mechanism includes, a planetary gear drive means operatively connected with a cam shaft for operating the main control valve unit, a drive operatively connecting the wing flap or other control element and the actuator with the planetary gear drive means, and a similar drive operatively connecting the control handle in the cockpit with said cam shaft and planetary drive in such manner that the planetary drive causes a "follow-up" movement of the cam shaft during the desired movement of the wing flap or other control element, as determined by the setting of the control handle, with the result that on final movement of said flap or other control element into the desired position, said cam shaft is returned to a neutral position shutting flow of operating fluid to the main actuator, thereby maintaining the flap or control element in the desired position, while the handle as a "tell-tale" indicator remains in a position indicating the position of the flap or other control.

In the present embodiment a servo-motor is provided for actuating the control valve unit and is in turn controlled by the position control mechanism hereof. This use of the servo-motor makes for reduction of the handle load on the cockpit control handle and affords a nicety and accuracy of response with a very small amount of handle movement. The present servo-motor 4-way control valve combination is the same as that forming the subject matter of my United States Letters Patent No. 2,321,267 for Hydraulic actuator for hydraulic control valves, issued on June 8, 1943.

With reference to Fig. 9 of the accompanying drawings, it is seen that a system embodying the present invention includes a main hydraulic cylinder or motor actuator 1 having its piston 2 connected for operating a wing flap 3, and controlled by a 4-way valve unit 4 to which latter the valve unit is hydraulically connected by fluid lines 5 and 6. A pump 7 connected with a reservoir 8 which in turn is connected by return line 9 to the valve 4, supplies operating fluid to said valve through a fluid line 7'.

A hydraulic servo-motor 10 is coupled to the valve unit 4 so that it will receive operating fluid therefrom subject to appropriate manipulation of valvular means 11 in the servo-motor as will be hereinafter more fully described. This servo-motor has an operative connection through a drive means 12 with the cam shaft 13 of the valve unit 4 to control the operation of the latter, there being a cam shaft 14 in the servo-motor arranged to be remotely controlled for actuating the valvular means 11.

As here provided the servo-motor 10 is controlled by position control mechanism which generally includes four elements, viz., a control handle 15 adapted to be located in the cockpit of the aircraft, a planetary gear drive means 16 on the servo-motor shaft 14, a cable-pulley drive means 17 operatively connecting said handle with said shaft and the planetary drive means, and a belt-pulley drive means 18 for operatively connecting the planetary drive means and shaft 14 with and for response of the actuator motor or cylinder 1 and the wing flap 3.

At this point it should be noted that another embodiment of my invention is the provision of a novel and efficient actuator mechanism unit which includes the servo-motor 10 and the position control mechanism hereof, apart from the connection of this unit to the 4-way valve, it being obvious that such an actuator unit is subject to many applications other than the operation of the 4-way valve here shown.

Referring now to Figs. 1 to 8 inclusive, it is seen that in the present embodiment of my invention, the 4-way valve 4, the servo-motor 10, the planetary drive 16, the pulley 19 being a part of drive means 18, and a rocker arm 17' being a part of the drive means 17, are connected to one another as a compact unit, as best shown in Figs. 1 and 6.

The selective 4-way valve unit 4 as shown in Fig. 1 includes a valve body 20 having an intake port 21 for fluid from the pump 8, two cylinder ports 22 and a return port 23. In this valve body are two valve receiving bores 24. In one of these bores are coaxial valves 25 and 26 while in the other bore are identical valves 25a and 26a, both dual valve units being arranged to be operated by the cam shaft 13 in a manner well known in the art so as to direct operating fluid to either end of the main cylinder or actuator 1.

The valves 25 and 25a are the pressure valves whereas valves 26 and 26a are the return valves and in the operation of this valve unit (see Fig. 9) one of the pressure valves and one of the return valves are opened simultaneously to effect movement of the piston 2 in one direction while to move the piston in the opposite direction the other pressure and return valves are likewise opened, these operations being effected by appropriate turning of the cam shaft 13.

The servo-motor is provided with a body member 27 as here shown, secured by fastenings 28 to one end of the body 21 of the valve unit 4. In this servo-motor valve body is a valve-receiving bore 29 for the valvular means 11. Operating fluid is supplied to the bore 29 from the intake or pressure fluid chamber 30 in the body 21 of valve unit 4, through a port 31 leading out through an end of the body 21 and opening into an intake passage 32 in the servo-motor body member 27 as best shown in Fig. 1, the port 31 and intake passage 32 being in registration with one another, and there being in the passage 32 an outwardly opening spring loaded check valve 33 to prevent back flow therethrough.

The valvular means 11 of the servo-motor is contained in a cylindrical cage 34 fitted in the bore 29 and provided with an intake port 34' in registration with an annular chamber 35 formed in said bore between the cartridge and the wall of the bore, said passage 32 opening into said chamber. The outer end of the cartridge 34 is closed by means of a flanged plug 36 held in place by a screw cap 37 turned in the outer end of the bore 29.

Extending longitudinally through the cage 34 are valve bores 38 and 39 having seats 40 intermediate their ends for ball valves 41 and 42 urged into seated position by means of springs 43. These ball valves are controlled by push rods 44 each of which has a piston-like enlargement 45 at its lower end, sealing the lower end of the associated valve bore and projecting beyond said bore into a cam shaft bore 46 for the cam shaft 14. Cams 47 and 48 on the cam shaft 14 are adapted to engage the push rods 44 to open and close the valves 41 and 42.

Fluid passages 49 and 50 lead from points in the bores 38 and 39 between the seats 40 and enlargements 45, for conducting operating fluid into opposite ends of a cylinder bore 51 formed in the body member 27 as best shown in Fig. 2. The cylinder bore 51 accommodates a reciprocable piston 52 held in a centered position by means of springs 53. This piston is a part of the aforesaid drive means 12 which also includes a drive pin 54 pivoted (see Figs. 1 and 2) as at 55 in a slot 56 in the piston and having a sliding fit in a slot 57 in the cam shaft 13 of the valve unit 4.

At this point it should be noted that the shaft 13 extends from the body of the valve unit 4 (see Fig. 1) into a chamber or recess 58 which is intersected by an intermediate portion of the cylinder bore 51 whereby the drive pin 54 may be connected to the piston and cam shaft as aforesaid. It is now apparent that on movement of the piston 51, the pin 54 causes the cam shaft 13 to be turned to operate the valve unit 4.

The valve bores 38 and 39 in the cage 34 are afforded communication with the cam shaft bore 46 by means of a T-shaped port 59 best shown in Fig. 1, said cam shaft bore affording a fluid space or passage as shown at 60 for fluid returned from the cylinder bore 51, through the passages 49 and 50, bores 38 and 39, and T-shaped port 59. The space or passage 60 opens into the chamber 58 in which the outer end of the cam shaft 13 is disposed, whereby a return passage 61 in the shaft 13 operates to return fluid from the servo-motor chamber 8 to the return port of the control valve 4, thence to the reservoir as shown in Fig. 9. In this connection it is noted that cam shaft 13 has a bearing portion 13a provided with a sealing ring 13b to seal the outer end of the cam shaft bore therefor and that cam shaft 14 has a similar bearing 14a and sealing ring 14b for sealing the outer end of the bore therefor.

As shown in Figs. 4 and 5, the entire valvular means 11 is adjustable to vary the setting of the push rods 44 relative to the cams 47 and 48 to regulate the opening and closing action of the valves 41 and 42. This is accomplished by turning the cage 34 about its axis by means of screws 62. This adjustment forms the subject matter of my United States Patent No. 2,323,947 for Adjustable hydraulic control valve, issued July 13, 1943.

As here provided the planetary drive means 16 (see Figs. 1, 7 and 8) includes a housing 64 mounted to rotate on and relative to the shaft 14 and which is secured by means of fastenings 65 to the pulley 19 mounted on ball bearings 66 to rotate relative to said shaft. A shaft 67 is rotatably supported in and by means of the housing 64 and the pulley 19 and in turn supports planetary gears 68 and 69 keyed thereto as at 69'. The planetary gear 68 meshes with a larger drive gear 70 having, for example, twice the diameter of gear 68 and carried by a sleeve 71 freely rotatable but suitably held on the shaft 14, the rocker arm 20 being fixed for rotation with the sleeve so that the gear 70 will be driven on movement of said rocker arm.

The planetary gear 69 meshes with a gear 72 keyed as at 72' to the shaft 14 and having the same ratio as gear 69 so that responsive to rotation of the gear 70 and consequent rotation of gears 68 and 69, together with the shaft 67, the gear 72 and shaft 14 will be turned at a faster rate than gear 70 to provide for a quick opening of the valves 41 and 42 with a small amount of movement of the control handle 15.

The drive means 18 which provides for the operation of the servo-motor to close the valves of the main valve unit 4 when the wing flap reaches the position predetermined by the setting of the handle 15, includes a belt 73 mounted on the pulley 19 and a pulley 74 operatively connected to turn with the wing flap as by means of being mounted on the shaft 75 therefor as shown in Fig. 1.

To make a positive drive and assure accuracy of performance the belt is fixed to the pulleys 19 and 74 by means of clamping devices 76. This is made possible as the pulleys are of the same diameter and have a turning moment of less than 90 degrees, for example, from 30 to 40 degrees in either direction from the neutral position thereof shown in Fig. 1.

When the drive means 18 operates the planetary drive during the movement of the wing flap 3 or other control, into predetermined position, said planetary drive acts as will be hereinafter more fully described to reverse the action of the servo-motor and close the valves in the main valve unit 4 and stop the operation of the hydraulic control system hereof.

Referring now to the control handle 15 and drive means 17 operated thereby, it is seen that the handle is pivoted as at 77 to swing in opposite direction from a neutral position over a fixed position indicating scale 78 calibrated in degrees of arc from a zero or neutral mark in the center up to from 30 to 40 or more degrees in either direction.

Any suitable detent means indicated at 77' is employed to frictionally hold the handle and drive means in any position to which such parts are moved. Cables 79 and 80 are connected to the handle 15 and the rocker arm 20, being guided by pulleys or rollers 81 to complete the drive means between the handle and the planetary gear drive 16.

*Operation*

When the pilot wishes to move the wing of the flap 3 from neutral position, shown in full lines in Fig. 9, downward a calibrated extent into the position shown in dotted lines, he merely moves the handle 15 to the right of its full line position in Fig. 9 to a position, for example, over the right hand ten degrees designation of the scale 78 and releases the handle. During this movement of the handle, in fact during the first few degrees of its movement, for example, the first seven degrees, the valves of the main control valve unit 4 will be fully opened.

As the control handle 15 is moved as aforesaid, the cable 79 rocks the rocker arm 20 so that the sleeve 71 and drive gear 70 thereon turn clockwise, driving the smaller planetary gear 68 counterclockwise at twice the speed of gear 70 and likewise rotating the shaft 67 and gear 69 counterclockwise. Gear 69 now drives gear 72 and shaft 14 clockwise at twice the rate of rotation of gear 70. As the shaft 14 rotates clockwise the cam 48 thereon lifts push rod 44 for the valve 42 opening said valve whereby operating fluid from the port 31 of the main valve unit 4 flows through passage 32 in the servo-motor body member 27 into the main bore 29 of the latter thence past open valve 42 through valve bore 39 and passage 49, to the right end (see Fig. 9) of the cylinder bore 51, thereby pushing the piston 52 to the left. Return fluid from the left end of the cylinder bore 52 is relieved through passage 50, valve bore 38, T-shaped port 59, into the cam shaft bore 46 thence through passage 61 in the cam shaft 13 to the return port 23 in the body 21 of the main valve 4. In this connection it should be noted that the end of the T-shaped return port 59 opening into the valve bore 39 is closed by the then-raised enlarged portion 45 of the push rod in valve bore 39, thereby preventing pressure fluid from passing through said T-port.

As the servo-motor piston 52 is moved to the right the sliding and rocking drive pin 54 is rocked so as to turn the cam shaft 13 counter-clockwise so that cams 13c and 13d (see Fig. 9) will be turned to open the pressure valve 25a and the return valve 26 whereupon pressure fluid will flow past open valve 25a through line 5 to the left end of the cylinder 1, moving the piston 2 to the right and turning the wing flap downward to the right.

As the wing flap is thus moved the pulley 74 is turned clockwise and through belt 73 turns pulley 19 clockwise whereby a planetary action of the gears 68 and 69 will take place to rotate the gear 72 and shaft 14 counterclockwise until the cam 48 allows valve 42 to close and cam 47 opens valve 41 thereby reversing the flow to the cylinder 51. This causes the piston 52 to move to the left so that the drive pin 54 will turn shaft 13 clockwise whereby valves 24 and 26 will be closed and the flow of operating fluid to the main cylinder 1 is stopped. As the wing flap reaches its predetermined position the cams 47 and 48 will have moved to allow both valves 41 and 42 to close thereby shutting off the servo-motor and hydraulically locking the system, and of course the wing flap in its selected position.

The "follow-up" action of the planetary gearing 16 is effected by reason of the fact that the gear 70 is held against rotation after the setting of the handle 15 due to friction of the drive means 17 and the detent means 77' associated with said handle. For example, when the pulley 19 is turned clockwise the gears 68 and 69 have a corresponding clockwise orbital movement but due to the differential ratio of the gears 68 and 69 and the gear 70 being held as aforesaid against rotation, the gear 69 will be driven so that the gear 72 and shaft 14 will be rotated counterclockwise, in the aforesaid instance. The rate of this rotation of the shaft 14 is such, in consideration with the time of response and time of operation of the valvular means 11 of the servo-motor, the piston 52 and the shaft 13 and valve means of the main control valve 4, that the valves of the latter will remain fully open until the last few degrees of movement of the wing flap into its intended position, for example, within the last seven degrees of movement thereof, at which time the main valves start to close and finally become fully closed with the final movement of said flap.

It is now apparent that when the control handle 15 is moved to the left of its neutral position shown in Fig. 9, to a calibrated position with reference to the scale 76, the cable 80 will turn the rocker arm sleeve 71 and gear 70 counter-clockwise whereupon gears 68 and 69 and shaft 67 are turned clockwise thereby rotating the cam shaft 14 counterclockwise so that cam 47 opens valve 41. This allows operating fluid to enter the left end of bore 52 through passage 49 of the servo-motor whereby the piston 52 is pushed to the right and the drive pin 54 drives the cam shaft 13 clockwise. This will turn cams 13e and 13f so that pressure valve 25 and return valve 26a will be opened to direct operating fluid through line 6 to the right end of cylinder 1, thereby moving the piston 2 so as to raise the flap 3 for example to the position shown in dashed lines in Fig. 9, return fluid then passing from cylinder 1, through line 5 past return valve 26a to return port 23. When the last few degrees of movement of the flap are being made the drive 18 operates the planetary drive 16 in the reverse manner to that previously described to reverse the flow of operating fluid to the servo-motor, which then turns shaft 13 to bring the valves of the unit 4 to closed position in the same manner and for the same purpose as hereinbefore described.

It should be noted that operating fluid is available for the servo-motor regardless of the valves of the main valve unit 4 being open or closed whereby said servo-motor is always responsive as a control and operating medium.

It is now apparent that the control mechanism hereof makes it possible to control the hydraulic cylinder or actuator with a nicety and responsiveness not heretofore provided for in the art and with but a small relative amount of control handle movement under a very small load, and in a particularly efficacious manner by reason of the particular construction, relative arrangement and combination of the parts and elements thereof.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a position control means for a motor actuated device, a motor, a control means for starting, stopping and reversing said motor, including an operating shaft rotatable in opposite directions, a driven means freely rotatable around said shaft and adapted to be rotated in response to operation of the device actuated by said motor, a drive gear freely rotatable on said shaft, a driven gear keyed to said shaft, a gear supporting shaft rotatably supported by said driven means and arranged to move orbitally of said operating shaft on rotation of said driven means, a planetary gear keyed to said gear supporting shaft and meshed with said drive gear, a second planetary gear keyed to said gear supporting shaft and meshed with said driven gear, means for turning said drive gear in either direction and holding it in a predetermined position so that while turning said drive gear will operate the planetary gears and driven gear to turn said operating shaft and operate said motor control means to start said motor for rotation in either direction, and means providing for the turning of said driven means responsive to actuation of the device actuated by said motor, so that the planetary gears will drive said driven gear in a direction to reverse the rotation of the operating shaft and operate the motor control means to shut off the motor when said motor has operated an extent predetermined by the extent of turning of said drive gear.

2. In a position control means, a motor, a control means for starting and stopping and reversing said motor including an operating shaft rotatable in opposite directions, a driven member rotatable on said shaft, a sleeve rotatable on said shaft, a drive gear carried by and rotating with said sleeve, a driven gear of smaller diameter than said drive gear keyed to said operating shaft, a gear supporting shaft rotatably supported by said driven member and arranged for orbital movement around said operating shaft, a planetary gear keyed to said gear supporting shaft and meshing with and having the same ratio as said driven gear, a second planetary gear keyed to said gear supporting shaft and having a lower ratio than and meshing with said drive gear, means for turning said sleeve and said drive gear and holding the latter in a position into which it is moved so that while the drive gear is turning, said planetary gears and said operating shaft will be turned to operate said control means to start said motor, and means responding to a given operation of said motor for turning said driven member and operating said planetary gears to reverse the direction of rotation of said operating shaft and actuate the control means to stop the operation of said motor.

3. In a position control means for a motor actuated device, a motor, a control means for starting, stopping and reversing said motor, including an operating shaft rotatable in opposite directions, a driven means freely rotatable around said shaft and adapted to be rotated in response to operation of the device actuated by said motor, a drive gear freely rotatable on said shaft, a driven gear keyed to said shaft, a gear supporting shaft rotatably supported by said driven means and arranged to move orbitally of said operating shaft on rotation of said driven means, a planetary gear keyed to said gear supporting shaft and meshed with said drive gear, a second planetary gear keyed to said gear supporting shaft and meshed with said driven gear, means for turning said drive gear in either direction and holding it in a predetermined position so that while turning said drive gear will operate the planetary gears and driven gear to turn said operating shaft and operate said motor control means to start said motor for rotation in either direction, and means providing for the turning of said driven means responsive to actuation of the device actuated by said motor, so that the planetary gears will drive said driven gear in a direction to reverse the rotation of the operating shaft and operate the motor control means to shut off the motor when said motor has operated an extent predetermined by the extent of turning of said drive gear, said drive gear being of greater diameter than the planetary gear enmeshed therewith, said second planetary gear being of the same diameter as the driven gear and of greater diameter than the first named planetary gear.

4. In a position control means for a motor actuated device, a motor, a control means for starting, stopping and reversing said motor, including an operating shaft rotatable in opposite directions, a driven means freely rotatable around said shaft and adapted to be rotated in response to operation of the device actuated by said motor, a drive gear freely rotatable on said shaft, a driven gear keyed to said shaft, a gear supporting shaft rotatably supported by said driven means and arranged to move orbitally of said operating shaft on rotation of said driven means, a planetary gear keyed to said gear supporting shaft and meshed with said drive gear, a second planetary gear keyed to said supporting shaft and meshed with said driven gear, means for turning said drive gear in either direction and holding it in a predetermined position so that while turning said drive gear will operate the planetary gears and driven gear to turn said operating shaft and operate said motor control means to start said motor for rotation in either direction, means providing for the turning of said driven means responsive to actuation of the device actuated by said motor, so that the planetary gears will drive said driven gear in a direction to reverse the rotation of the operating shaft and operate the motor control means to shut off the motor when said motor has operated an extent predetermined by the extent of turning of said drive gear, said planetary gears being constructed and arranged to transmit an accelerated rotational movement from said drive gear to said driven planetary gear.

5. In a position control means for a motor actuated device, a motor, a control means for starting, stopping and reversing said motor, including an operating shaft rotatable in opposite directions, a driven means freely rotatable around said shaft and adapted to be rotated in response to operation of the device actuated by said motor, a drive gear freely rotatable on said shaft, a driven gear keyed to said shaft, a gear supporting shaft rotatably supported by said driven member and arranged to move orbitally of said operating shaft on rotation of said driven member, a planetary gear keyed to said gear supporting shaft and meshed with said drive gear, a second planetary gear keyed to said gear supporting shaft and meshed with said driven gear, means for turning said drive gear in either direction and holding it in a predetermined position so that while turning said drive gear will operate the planetary gears and driven gear to turn said operating shaft and operate said motor control means to start said motor for rotation in either direction, means providing for the turning of said driven member responsive to actuation of the device actuated by said motor, so that the planetary gears will drive said driven gear in a direction to reverse the rotation of the operating shaft and operate the motor control means to shut off the motor when said motor has operated an extent predetermined by the extent of turning of said drive gear, said means for turning said drive gear including a control handle remote from said gear, a sleeve rotatable on said operating shaft and supporting said drive gear; and drive means for turning said sleeve responsive to the turning of said handle, said drive means including a pair of cables one of which rotates said sleeve in one direction and the other of which rotates said sleeve in the opposite direction.

JACOB B. VAN DER WERFF.